US010983848B2

(12) United States Patent
Degioanni et al.

(10) Patent No.: US 10,983,848 B2
(45) Date of Patent: Apr. 20, 2021

(54) IMPLICIT PUSH DATA TRANSFER (71) Applicant: Sysdig, Inc., San Francisco, CA (US)

(72) Inventors: Loris Degioanni, Davis, CA (US); Gianluca Borello, Pleasanton, CA (US); Luca Marturana, Favara (IT)

(73) Assignee: Sysdig, Inc., San Francisco, CA (US)

( * ) Notice: Subject to any disclaimer, the term of this patent is extended or adjusted under 35 U.S.C. 154(b) by 68 days.

(21) Appl. No.: 15/170,290

(22) Filed: Jun. 1, 2016

(65) Prior Publication Data

US 2016/0357618 A1 Dec. 8, 2016

Related U.S. Application Data (60) Provisional application No. 62/169,542, filed on Jun. 1, 2015.

(51) Int. Cl.
*G06F 9/54* (2006.01)
*G06F 11/30* (2006.01)
*G06F 9/455* (2018.01)

(52) U.S. Cl.
CPC .......... *G06F 9/546* (2013.01); *G06F 9/45558* (2013.01); *G06F 11/30* (2013.01); *G06F 11/3089* (2013.01); *G06F 2009/45591* (2013.01)

(58) Field of Classification Search
CPC ....... G06F 9/546; G06F 11/30; G06F 9/45504
See application file for complete search history.

(56) References Cited

U.S. PATENT DOCUMENTS

| | | | |
|---|---|---|---|
| 7,814,491 B1 | 10/2010 | Chen et al. | |
| 8,380,684 B2 * | 2/2013 | Hollingsworth | .... G06F 17/3056 707/694 |
| 8,683,467 B2 * | 3/2014 | Bingham | ............ G06F 9/45533 718/1 |

(Continued)

OTHER PUBLICATIONS

International Searching Authority, "Search Report" in application No. PCT/US2016/035225, dated Sep. 1, 2016, 30 pages.

(Continued)

*Primary Examiner* — Doon Y Chow
*Assistant Examiner* — Phuong N Hoang
(74) *Attorney, Agent, or Firm* — Hickman Becker Bingham Ledesma LLP (57) ABSTRACT A computer-implemented method comprises executing, in a first container of a first computer system, input source instructions; executing, using the same first computer system, a plurality of containerized application programs in different corresponding containers; monitoring, by the input source instructions, the one or more different containerized application programs by identifying one or more system calls that resulted from the different container applications generating statistical messages relating to operation of the containerized application programs; generating, by the input source instructions, one or more enriched messages based on the system calls that were identified and based on the statistical messages; transmitting the one or more enriched messages to a first metric collector, and aggregating a plurality of the enriched messages into a set of aggregated metrics values; sending, from the first metric collector to a monitoring application that is hosted on a second computer system, the aggregated metrics values.

16 Claims, 4 Drawing Sheets

(56) References Cited

U.S. PATENT DOCUMENTS

| | | | |
|---|---|---|---|
| 9,037,705 B2* | 5/2015 | Blackwell | H04L 43/04 709/224 |
| 9,122,562 B1* | 9/2015 | Stickle | G06F 8/71 |
| 9,223,598 B1* | 12/2015 | Koryakina | G06F 9/455 |
| 9,251,481 B2* | 2/2016 | Richter | G06Q 10/06 |
| 9,280,437 B2* | 3/2016 | Malhotra | G06F 11/3065 |
| 2005/0060722 A1 | 3/2005 | Rochette et al. | |
| 2005/0249199 A1* | 11/2005 | Albert | H04L 67/1008 370/352 |
| 2006/0146816 A1* | 7/2006 | Jain | H04L 63/1408 370/389 |
| 2007/0043860 A1* | 2/2007 | Pabari | G06F 9/455 709/224 |
| 2007/0143455 A1* | 6/2007 | Gorman | G06F 11/3495 709/223 |
| 2010/0161660 A1 | 6/2010 | De Angelo | |
| 2012/0159454 A1* | 6/2012 | Barham | G06F 11/3466 717/128 |
| 2012/0203890 A1* | 8/2012 | Reynolds | G06F 11/3495 709/224 |
| 2012/0246157 A1* | 9/2012 | Theimer | G06F 8/77 707/736 |
| 2013/0159999 A1* | 6/2013 | Chiueh | G06F 9/45504 718/1 |
| 2013/0198368 A1* | 8/2013 | Patterson | H04L 67/101 709/224 |
| 2013/0326507 A1* | 12/2013 | McGrath | G06F 9/4856 718/1 |
| 2014/0047438 A1 | 2/2014 | Da Silva et al. | |
| 2014/0047535 A1 | 2/2014 | Parla et al. | |
| 2014/0149575 A1* | 5/2014 | Blackwell | H04L 43/04 709/224 |
| 2014/0172371 A1* | 6/2014 | Zhu | G06F 11/0703 702/185 |
| 2015/0039745 A1 | 2/2015 | Daraios et al. | |
| 2015/0120928 A1* | 4/2015 | Gummaraju | H04L 67/1008 709/226 |
| 2015/0150025 A1 | 5/2015 | Yuen et al. | |
| 2015/0334110 A1* | 11/2015 | Bishop | H04L 9/3268 713/156 |
| 2016/0103717 A1* | 4/2016 | Dettori | G06F 9/542 719/318 |

OTHER PUBLICATIONS

Current Claims in application No. PCT/US2016/035225, dated Sep. 2016, 5 pages.

* cited by examiner

IMPLICIT PUSH DATA TRANSFER

BENEFIT CLAIM

This application claims the benefit under 35 U.S.C. § 119(e) of provisional application 62/169,542, filed Jun. 1, 2015, the entire contents of which are hereby incorporated by reference for all purposes as if fully set forth herein.

TECHNICAL FIELD

The present disclosure generally relates to inter-process data communications in containerized computer systems. The disclosure relates more specifically to communicating data between a first process within a first container and a second process within a second container without the need for a local collector process.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Managing computer program applications running on networked computing devices typically involves some aspect of monitoring the applications. Monitoring can involve collecting application messages and other data traffic that the applications emit toward a network, directed at peer instances of the applications, directed at servers, or directed at client computing devices. The open source software project "statsd" (or STATSD) has emerged as a popular means of collecting application traffic and aggregating the traffic for analysis. The "statsd" software is organized as a daemon that can perform statistics aggregation and is available at the time of this writing in the Github repository system via the repository name etsy/statsd.

Containerization has emerged as a popular alternative to virtual machine instances for developing computer program applications. With containerization, computer program code can be developed once and then packaged in a container that is portable to different platforms that are capable of managing and running the containers. Consequently, containerization permits faster software development for the same program for multiple different platforms that would otherwise require separate source branches or forks, or at least different compilation and execution environments. However, containerization also can impose constraints on inter-program communications.

SUMMARY

The appended claims may serve as a summary of the invention.

Figure 2:
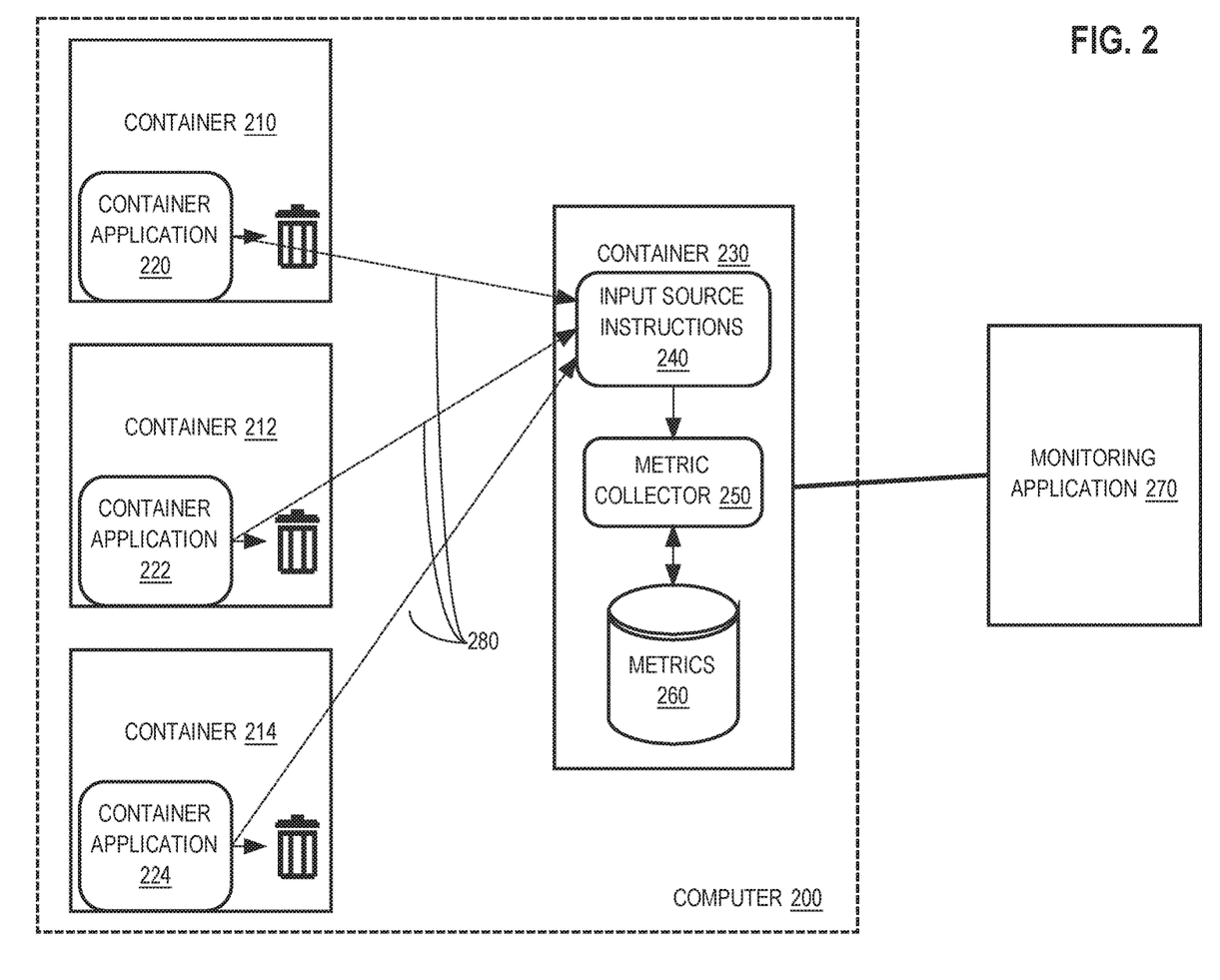
FIG. 2 illustrates an example system consisting of a plurality of containers and a monitoring application for communicating data between a first process within a first container and a second process within a second container without the need for a local collector process according to one embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, container 210, container 212, container 214 in FIG. 2 may be described with reference to several steps in FIG. 3 and discussed in detail below, but using the particular arrangement illustrated in FIG. 2 is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Furthermore, words, such as "or," may be inclusive or exclusive unless expressly stated otherwise.

Embodiments are described herein according to the following outline:

1.0 General Overview
2.0 Example System for Communicating Data between a First Process within a First Container and a Second Process within a Second Container
3.0 Example System for Communicating Data between a First Process within a First Container and a Second Process within a Second Container without the Need for a Local Collector Process
4.0 Process for Communicating Data between a First Process within a First Container and a Second Process within a Second Container without the Need for a Local Collector Process
5.0 Selected Benefits of Embodiments
6.0 Implementation Mechanisms - Hardware Overview
7.0 Other Aspects of Disclosure

1.0 General Overview

Systems and methods are discussed herein for communicating data between a first process within a first container and a second process within a second container without the need for a local collector process. In one embodiment, a computer implemented method for communicating data between a first process within a first container and a second process within a second container without the need for a local collector process comprises executing, in a first container of a first computer system, input source instructions; executing, using the same first computer system, a plurality of containerized application programs in different corresponding containers; monitoring, by the input source instructions, the one or more different containerized application programs by identifying one or more system calls that resulted from the different container applications generating statistical messages relating to operation of the containerized application programs; generating, by the input source instructions, one or more enriched messages based on the system calls that were identified and based on the statistical messages, transmitting the one or more enriched messages to a first metric collector, and aggregating a plurality of the enriched messages into a set of aggregated metrics values; sending, from the first metric collector to a monitoring application that is hosted on a second computer system, the aggregated metrics values.

In another embodiment, a computer-implemented method comprises executing, in a first container of a first computer system, input source instructions; executing, using the same first computer system, a plurality of containerized application programs in different corresponding containers; monitoring, by the input source instructions, the one or more different containerized application programs by identifying one or more system calls that resulted from the different container applications generating statistical messages relating to operation of the containerized application programs and communicating the statistical messages to a "localhost" interface of the first computer system, wherein each of the one or more system calls is one of: read, write, send, sendto, recv, recvfrom, sendmsg, sendmmsg, recvmsg, recvmmsg, pread, pwrite, ready, writev, preadv, pwritev, sendfile; generating, by the input source instructions, one or more enriched messages based on the system calls that were identified and based on the statistical messages by adding one or more of a container name tag, an application ID tag, and an image name tag to the statistical messages; transmitting the one or more enriched messages to a first metric collector; aggregating a plurality of the enriched messages into a set of aggregated metrics values; sending, from the first metric collector to a monitoring application that is hosted on a second computer system, the aggregated metrics values.

In another embodiment, a computer system comprises a first programmatic container that contains an application program that is programmed to send a plurality of application metrics messages to a localhost interface of the computer system and to cause generating one or more system calls each time that one of the application metrics messages is sent; a second programmatic container, logically separate from the first programmatic container, that is programmed to host a set of input source instructions and a collector module; wherein the input source instructions are programmed to listen for the one or more system calls and, in response to detecting a particular system call, to obtain a particular application metrics message that is associated with the particular system call, to tag the particular application metrics message with one or more tag values and to send the particular application metrics message with the tag values to the collector module.

In some approaches, techniques to aggregate and summarize application metrics consists of a metric collector that resides on a different machine and aggregates traffic from all metric sources. Typically, the metric collector is listening for any metrics sent to it from the applications it is monitoring in what is called active collection of metrics. The metric collector is reachable through a static IP address or an ad hoc DNS entry.

However, this become cumbersome as each metric update must travel across the network to the metric collector, which imposes a tradeoff between the frequency of metric updates and the network bandwidth that is consumed. As a result, in situations where conserving network bandwidth is preferred, fewer metric updates are available than desired. Additionally, these metrics may travel separately from metrics gathered under different metric systems but corresponding to the same application or container thus decreasing the opportunity to compress and efficiently transmit performance data. Finally, it is not possible to tag and enhance the metrics with context data for successive segmentation, because information is lost about which container, host or application generated the metric.

In other approaches, which attempts to deal with these limitations, each container hosts a local metric collector. Each local metric collector aggregates different types of metrics from different metric systems into samples that are sent to a general purpose monitoring backend at regular intervals. These aggregated metrics sample messages then travel across the network to reach a monitoring backend program. While this approach is more efficient than the prior one, particularly with bigger deployments, due to the fact that metrics are aggregated and compressed before they are sent to the monitoring backend, it runs into many limitations in containerized systems. The addition of a metric collection agent to every container is inefficient, complicates deployments, and does not adhere to the container philosophy of having one process per container.

To address this inefficient duplication of metric collection agents in every container, other approaches, place a metric collector on the same machine as the containers but in its own monitoring container. The monitoring container is configured for collecting system metrics, stitching everything together and sending samples to a general-purpose backend at regular intervals. While this solves the problem of duplicate metric collectors, the applications in each container must be configured with target locations to which the applications should send the metrics. This mechanism is quite rudimentary and pretty fragile. For example, it makes it hard to update the monitoring container, because each update will almost certainly change the IP address of the monitoring container and destroy the linking. Another approach is assigning a static IP to the monitoring container. This has all the limitations involved with using static IP addresses, including possible address conflicts if a monitoring container is needed on each physical host.

Figure 1:
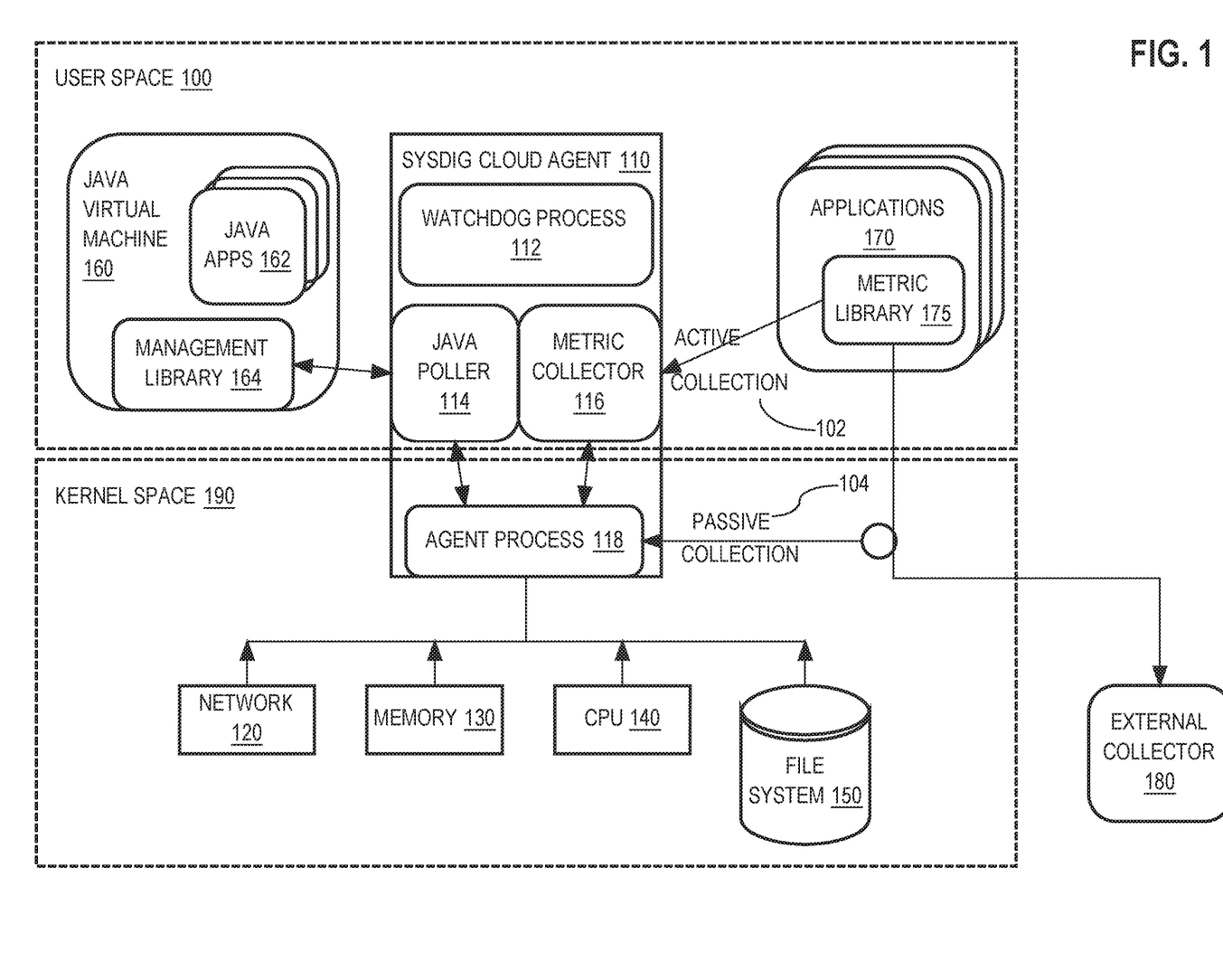
FIG. 1 illustrates an example system consisting of a virtual machine, a cloud agent, and a plurality of applications according to the current state of the art.

2.0 Example System for Communicating Data Between a First Process within a First Container and a Second Process within a Second Container FIG. 1 illustrates an example computer system that is configured to perform monitoring of application metrics using either active or passive collection.

In the example of FIG. 1, one or more applications 170 and a virtual machine 160, which may comprise a JAVA virtual machine or other types of virtual machines, are hosted and execute in user space 100 under control of an operating system. One or more applications or apps 162 execute under control of the virtual machine 160. For purposes of illustrating a clear example, FIG. 1 shows the apps as JAVA apps, but other embodiments may be used with JAVASCRIPT, PYTHON, PHP, RUBY, GO, and others. Other computing resources such as network 120, memory 130, CPU 140, and filesystem 150 are hosted or execute in kernel space 190, which is isolated from user space 100 by operating system operations.

In an embodiment, a monitoring cloud agent 110 is communicatively coupled to the virtual machine 160 via management library 164 and poller 114, and communicatively coupled to application 170 via metric library 175 and metric collector 116. In an embodiment, the monitoring cloud agent 110 also comprises a watchdog process 112 and agent process 118. The monitoring cloud agent 110 is communicatively coupled to the resources in kernel space 190. Metric library 175 is communicatively coupled to external collector 180.

In the example system of FIG. 1, metrics are collected both actively and passively. In active collection 102, the monitoring cloud agent 110 receives metrics from applications 170 via metric library 175, which dictate how to transmit the communications such that the metric collector 116 receives it and understands how to interpret it. Additionally, in passive collection 104, agent process 118 automatically intercepts communication between metric library 175 and external collector 180.

In an embodiment, the monitoring cloud agent 110 comprises an embedded metrics server process, such as a STATSD server, which has been programmed or configured to send custom metrics to a collector and relayed to a back-end database system for aggregation. Applications can define specific metrics, and those custom metrics plus standard metrics that are pre-programmed can be visualized in the same graphical interface. For purposes of illustrating a clear implementation example, this description focuses on techniques applicable to deployment of the STATSD statistics aggregation daemon software. However, the techniques described herein may be used with other systems that are programmed using push-based protocols not related to aggregation or statistics, and use with STATSD is not required. For example, the "metrics" library, which is available at the time of this writing in the Github repository "dropwizard", may be used with the techniques herein.

In an embodiment, with active collection, a collector program listens on port "8125," which is the standard STATSD port, on TCP and UDP. STATSD is a text-based protocol in which data samples are separated by the character \n. Programming STATSD to send metrics from an application to the collector can be performed using the following example command:

echo "hello_statsd:1|c" |nc-u-w0 127.0.0.1 8125

In this example, the counter metric "hello_statsd" is transmitted with a value of "1" to the netcat process, which handles the UDP network write operation to the collector on port "8125".

In one embodiment, the protocol format is:

<metric_name>:<value>|<type>[@<sampling_ratio>]

Each <metric_name> can be any string except certain reserved characters such as "#". The <value> is a number and depends on the metric type. Sampling ratio is a value between 0 (exclusive) and 1, and is used to handle sub sampling.

In an embodiment, the metric type indicated by <type> can be any of: counter, histogram, gauge, and set. Other embodiments may implement other forms of metrics. A counter metric is updated with a value that is sent by the application, sent to the back-end database, and then reset to zero. An application can use a counter, for example, to count how many calls have been made to an API. Negative values result in decrementing a counter. A histogram metric may be used, for every sample received, to calculate aggregations such as sum, min, max, mean, count, median, and percentiles. Histograms may be used to send metrics such as access time, file size, and others. A gauge is a single value that is transmitted "as is". Relative increments or decrements of a counter can be achieved by specifying "+" or "−" before a gauge value. A set is like a counter but counts unique elements. As an example, the following syntax causes the value of "active_users" to be "2": active_users:user1|s active_users:user2|s active_users:user1|s. In an embodiment, metrics may be tagged using strings, key-value pairs, and other values.

Turning now to passive collection, in infrastructures already containing a third party STATSD collection server, STATSD metrics can be collected "out of band". A passive collection technique is automatically performed by the monitoring cloud agent 110 by intercepting system calls. This method does not require changing a current STATSD configuration. Passive collection is particularly useful for containerized environments in which simplicity and efficiency are important. In an embodiment, with a containerized version of the monitoring cloud agent 110 running on the host, all other container applications can continue to transmit to any currently implemented collector. If no collector is executing, then container applications can be configured to send STATSD metrics to the localhost interface (127.0.0.1) as shown in the example command above; there is no requirement for a STATSD server to be listening at that address.

In effect, each network transmission made from inside the application container, including STATSD messages that are sent to a non-existent destination, generates a system call. The monitoring cloud agent 110 captures these system calls from its own container, where the STATSD collector is listening. In practice, the monitoring cloud agent 110 acts as a transparent proxy between the application and the STATSD collector, even if they are in different containers. The agent correlates which container a system call is coming from, and uses that information to transparently tag the STATSD messages.

3.0 Example System for Communicating Data Between a First Process within a First Container and a Second Process within a Second Container without the Need for a Local Collector Process FIG. 2 illustrates an example system consisting of a plurality of containers and a monitoring application for communicating data between a first process within a first container and a second process within a second container without the need for a local collector process according to one embodiment.

In the example of FIG. 2, a computer system 200 hosts or executes a plurality of containers 210, 212, 214, 230. For example, each of the containers may be instantiated and managed using the DOCKER® containerization system, commercially available from Docker Inc., San Francisco, Calif., or using the LXC containerization system or CoreOS containers. Each of the container 210, container 212, and container 214 respectively contains container application 220, container application 222, and container application 224. Three (3) such containers and applications are shown solely to illustrate a clear example, and other embodiments may use any number of containers. These may be independent applications having different functionality, or may be different instances of the same application; the applications 220, 222, 224 emit application metrics.

Container 230 comprises input source instructions 240, metric collector 250, and a database or repository of metrics 260. In an embodiment, the input source instructions 240 comprise the SYSDIG or "sysdig" cloud agent software that is commercially available from Draios, Inc., Davis, Calif. The metric collector 250 may be implemented as a STATSD agent, as an example. Container 230 further is communicatively coupled using a network connection to monitoring application 270 which typically is hosted or executed using a separate machine than the computer 200. Monitoring application 270 may be termed a monitoring back-end and may comprise persistent data storage, analytics systems, and/or a presentation layer for user interaction.

Instructions 240 may comprise a program that is configured to enrich, aggregate, analyze and report upon metrics that are collected not just via STATSD, but from any of a plurality of different programs, apps, systems or subsystems that may be distributed throughout a distributed system in relation to applications or infrastructure or both. The instructions 240 may be programmed to correlate data received from the metric collector 250 with other metrics received across the computing environment to result in creating and storing system-application metrics 260.

For purposes of illustrating a clear example, monitoring application 270 is pictured outside of system 100, however, monitoring application 270 can also reside in computer 100 with container 210, container 212, container 214, and container 230. A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, routers, hubs, switches, desktop computers, laptop computers, mobile devices, or any other special-purpose computing devices. Any reference to "a computer" herein may mean one or more computers, unless expressly stated otherwise and any reference to a "router" can mean any element of internetworking gear. Further, each of the containers 210, 212, 214 may be physically present in a computer that is local to an enterprise or owner or operator, or located in a shared computing center such as in a cloud computing environment.

In this arrangement, the applications within the containers 210, 212, 214 send metrics, for example in the form of STATSD messages, to the "localhost" interface. This may be accomplished by programming or configuring the STATSD daemon to write to the local address "127.0.0.1". Otherwise, there is no need to code a collector IP address in the apps, and there is no need to deal with the complications imposed by static programming of an address. Since there is no STATSD collector on the localhost interface, the UDP payload of the emitted STATSD messages is dropped in each case, which is illustrated in FIG. 2 by "trashcan" icons. However, the same message automatically appears in the monitoring container, where it is received by instructions 240. In response, the instructions 240 may enrich the received metrics message with one or more tags that can be used for segmentation or other downstream analysis. Example tags include a container name, application ID and image name. In one embodiment, the instructions 240 may be programmed to receive definitions of additional tags that are specified in user-created configuration data.

Further, in one embodiment, the instructions 240 may be programmed to merge the metrics messages with other system, network or application metrics that have been generated internally using the instructions 240. The combined metrics may be compressed and then communicated to the back-end system at any suitable rate, such as once per second.

Information about how to set up a "sysdig" cloud agent, as one implementation for example of instructions 240, is described in documents that are available online at the time of this writing in the files "204498905-Agent-Installation-Instructions" and "204418585-Container-Deployment," both in the "/hc/en-us/articles/folders of the "support" folder at the domain "sysdigcloud.com" on the internet, and can be retrieved using HTTP.

Lines 280 in FIG. 2 indicate implicit communication paths between application containers 210, 212, 214 to the monitoring container 230. To accomplish transmission of metrics messages, such as STATSD messages, from the application containers to the monitoring container 230, in an embodiment, each network transmission made from inside the application containers 210, 212, 214, including STATSD messages and including any other messages sent to a non-existent destination, generate a system call inherently via operation of the containerization system. The instructions 240 are programmed to capture or listen for such system calls, from a separate container 230 that also includes the metrics collector 250, which also is programmed to listen for system calls. In practice, the instructions 240 act as a transparent proxy between the applications in containers 210, 212, 214 and the collector 250, even if they are in different containers.

Specific example techniques that can be used to cause the instructions to detect system calls and respond to the system calls are disclosed in application Ser. No. 13/953,970, filed Jul. 30, 2013, US patent publication 20150039745A1, the entire contents of which are hereby incorporated by reference for all purposes as if fully set forth herein. The reader of the present patent document is assumed to have familiarity with and understand US patent publication 20150039745A1 for purposes of implementing the techniques disclosed herein.

Examples of system calls that a push-based protocol could generate, and that the instructions 240 could be programmed to listen for, include: read, write, send, sendto, recv, recvfrom, sendmsg, sendmmsg, recvmsg, recvmmsg, pread, pwrite, ready, writev, preadv, pwritev, sendfile. Other system calls can be used depending on the operating system family of the machine that hosts the containers, operating system version, and processor architecture.

The instructions 240 also are programmed to determine which container a particular system call is coming from, and the instructions 240 may use that information to transparently tag the stated message.

Figure 3:
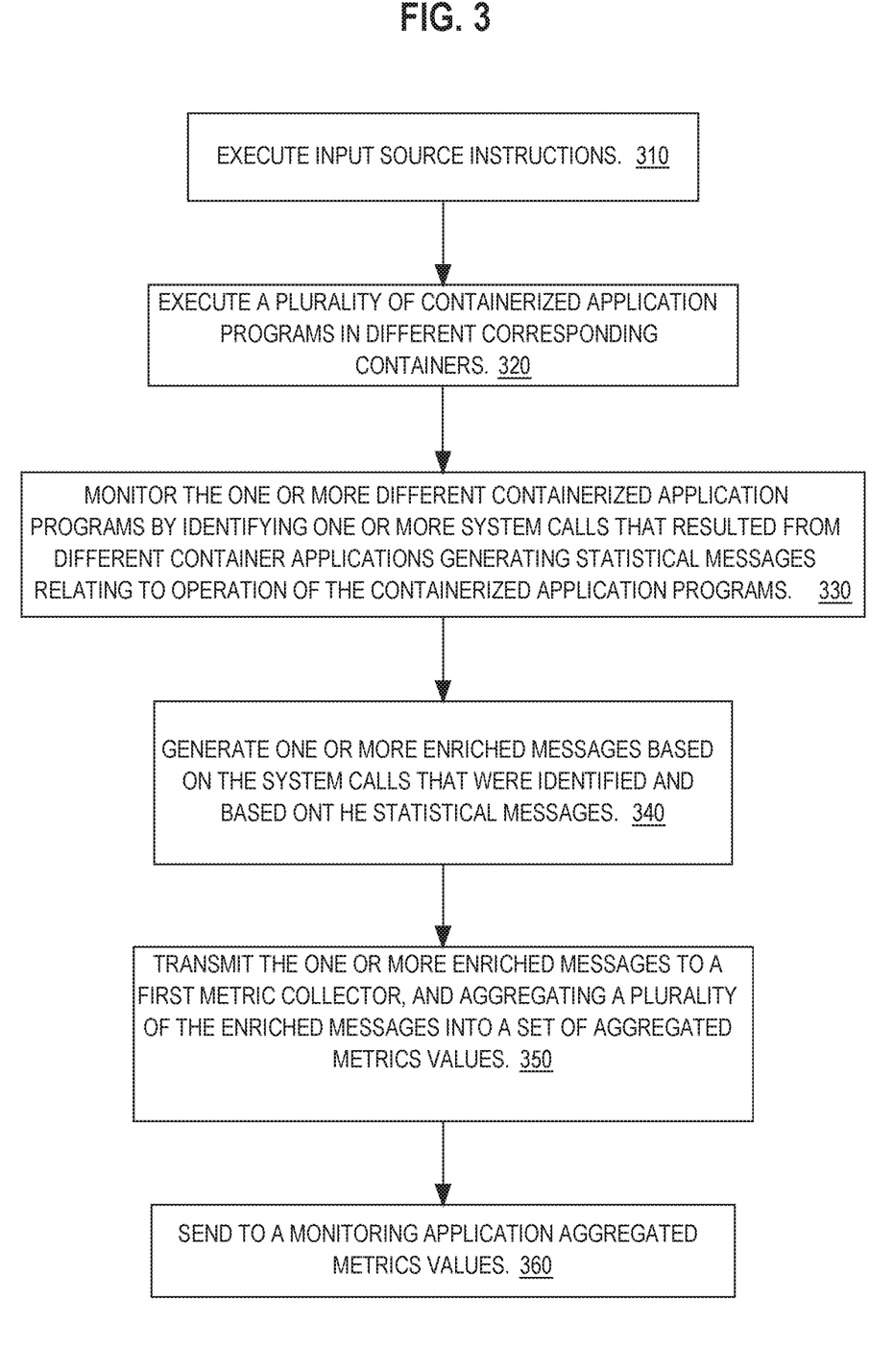
FIG. 3 illustrates a process for communicating data between a first process within a first container and a second process within a second container without the need for a local collector process according to one embodiment.

4.0 Process for Communicating Data Between a First Process within a First Container and a Second Process within a Second Container without the Need for a Local Collector Process FIG. 3 illustrates a process when performed on the example system of FIG. 2 for communicating data between a first process within a first container and a second process within a second container without the need for a local collector process according to one embodiment.

In step 310, input source instructions 240 are executed in container 230 in computer 200.

In step 320, also in computer 200 a plurality of containerized application programs in different corresponding containers are executed. Here, container application 220, container application 222, container application 224 are executed in container 210, container 212, container 214 respectively.

As container 210, container 212, container 214, and container 230 all reside on the same computer. They each will execute system calls in order to interact with the resources and applications comprising computer 200 in addition to sending statistical messages regarding each container's performance.

In step 330, input source instructions 240 monitor the one or more different containerized application programs by identifying one or more system calls that resulted from different container applications generating statistical messages relating to operation of the containerized application programs.

Here, as explicitly and intentionally omitted in FIG. 2 there is no communication between container application 220, container application 222, container application 224 and input source instructions 240. In an embodiment, each network transmission is made from inside the application containers, including statistical messages and including ones sent to a nonexistent destination, generates a system call. Input source instructions 240 monitors for system calls and detects these system calls originating from container 210, container 212, and container 214.

As container 230 resides on the same computer as container 212, container 214, container 216, input source instructions 240 can be configured to listen to system calls made by container application 220, container application 222, container application 224 to computer 200. Some examples of system calls that the input source instructions can monitor include but are not limited to: read, write, send, sendto, recv, recvfrom, sendmsg, snedmmsg, recvmsg, recvmmsg, pread, pwrite, ready, writev, preadv, pwritev, sendfile. Other system calls may be used depending on the operating system family of the machine that hosts the containers, operating system version and processor architecture.

In step 340, input source instructions 240 generates one or more enriched messages based on the system calls that were identified and based on the statistical messages.

Here, input source instructions 240 generates enriched messages based on the system calls that it monitored and the statistical messages sent regarding the performance of the container 210, container 212, container 214, and container application 220, container application 222, container application 224. These enriched messages can contain metadata and tags that aid in fine-tuning performance. Example tags include but are not limited to a container name, application ID, and image name.

Additionally, input source instructions 240 can be programmed to pull associated groupings and hierarchies automatically so that segmenting the enriched messages by group or by host can be done readily. For example if container 210, container 212, container 214, and container application 220, container application 222, container application 224 were related to one another by grouping or hierarchy, input source instructions 240 can further segment enriched messages such that metric collector can better send relevant data, together, to monitoring application 270.

Additionally, input source instructions 240 can be programmed to perform automatic correlation of received statistical messages to create enriched messages. These enriched messages can, but are not required to, take the form of system metrics, application metrics, infrastructure metrics, network metrics, and container metrics.

In step 350, input source instructions 240 transmits the one or more enriched messages to a first metric collector 250, and aggregates a plurality of the enriched messages into a set of aggregated metrics values.

Here, metric collector 250 receives the one or more enriched messages from input source instructions 240 and stores them as metrics 260 in preparation for sending on to monitoring application 270 in step 360.

In step 360, metric collector 250 sends the aggregate metrics values to monitoring application 270. In order to limit the amount of bandwidth-consumption, particularly with large amounts of metrics being collected on larger and larger systems with many containers, the metric collector takes a set of aggregated metrics values and can send them on to the monitoring backend at designated intervals or even in compressed format.

The instructions 240 also may be programmed to pull in the associated groupings and hierarchies of a metrics system automatically, so that segmenting the STATSD data by group or by host for example can be done. The instructions 240 further may be programmed to perform automatic correlation of received custom application metrics with other metrics from across the computing environment in which the containers are running. Example metrics that can be correlated include: system (CPU, memory, disk usage); application (JMX, HTTP, status codes); infrastructure (SQL, MongoDB, Redis, Amazon Web Services); network (traffic, connections); containers (DOCKER, COREOS, LXC).

5.0 Selected Benefits of Embodiments

The disclosure has described a low impact high efficiency mechanism to communicate data between processes located in different containers without the need of local collector process. In one respect, a mechanism to collect metrics from multiple containers without the overhead of duplicate metric collectors, complex linking, and bandwidth-heavy communication. Embodiments provides the benefits of local metrics collectors without the drawbacks described above arising from conventional container integration. For example, one benefit is that there is no need to instrument the container in any way. The programming of apps to "push metrics to localhost" is simple and easy to understand.

Another benefit is that no special network configuration is required; for example, there is no need to deal with DNS or static IP address. Additionally, as the input source instructions monitors system calls, another benefit is that metric collection systems that are already implemented would not need to be modified or dismantled. Input source instructions would automatically system calls associated with metric communications from the containers and incorporate them.

The approach also provides local aggregation with minimal bandwidth overhead. The approach can use existing container tagging or host tagging, and permits aggregation of metrics with the best available container system without complex programming or adaptation. Containers that are already running STATSD or another metrics program do not require special instrumentation, or a STATSD server in the container, and there is no need for network tuning of bandwidth usage.

The approach disclosed herein also works when the apps are already exporting metrics to an existing collector. The instructions 240 will automatically capture these exports also, with minimal overhead and no disruption to the current export. In other words, if a particular user computer already has the STATSD project installed and running for example, then adding the instructions 240 programmed as described herein will result in automatically capturing STATSD push metrics messages without any special configuration of STATSD. Instead, the instructions 240 are programmed to listen for those system calls that are ordinarily generated by the conventional operation of a metrics program such as STATSD, and to obtain the metrics messages that were associated with those system calls.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
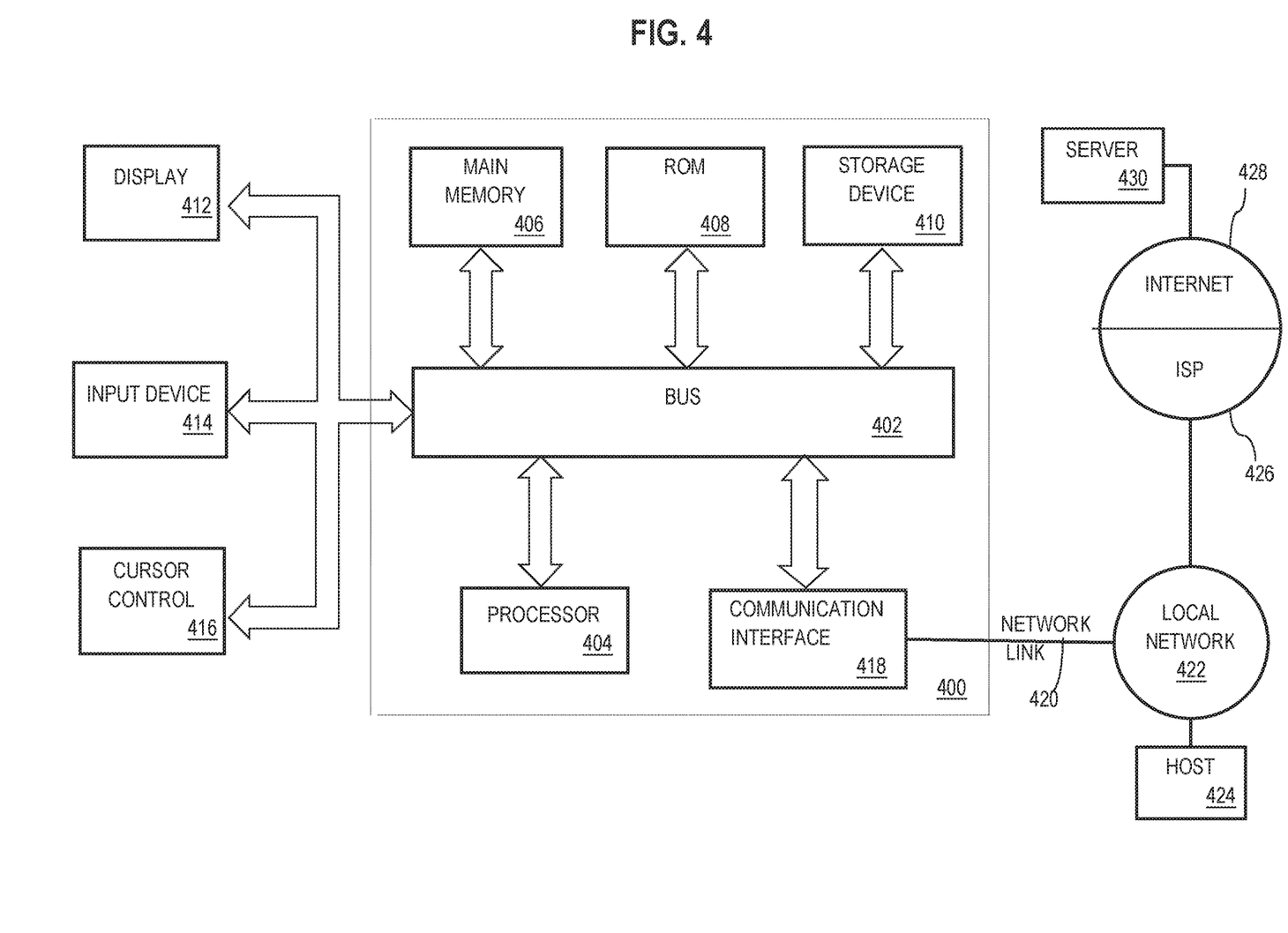
FIG. 4 illustrates a computer system upon which an embodiment of the invention may be implemented according to one embodiment.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main-memory 406, such as a random access memory (RAM) or other dynamic storage device, coupled to bus 402 for storing information and instructions to be executed by processor 404. Main-memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main-memory 406. Such instructions may be read into main-memory 406 from another storage medium, such as storage device 410. Execution of the sequences of instructions contained in main-memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main-memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main-memory 406, from which processor 404 retrieves and executes the instructions. The instructions received by main-memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server computer 430 might transmit a requested code for an application program through Internet 428, ISP 426, local network 422 and communication interface 418.

The received code may be executed by processor 404 as it is received, and/or stored in storage device 410, or other non-volatile storage for later execution.

7.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    executing, in a first container of a first computer, an input source agent and a metric collector;
    executing, using the first computer, a plurality of containerized application programs in different corresponding containers, wherein the plurality of containerized application programs are configured to: send one or more statistical messages to a localhost interface of the first computer; and send, to a host operating system kernel of the first computer each time a statistical message is sent, one or more system calls to interact with one or more resources or one or more applications of the first computer;
    intercepting, by the input source agent, a plurality of system calls sent from the plurality of containerized application programs to the host operating system kernel of the first computer to interact with one or more resources or one or more applications of the first computer;
    based on the intercepting of the plurality of system calls, obtaining, by the input source agent, a plurality of statistical messages relating to operation of the plurality of containerized application programs, wherein the plurality of statistical messages are distinct from the plurality of system calls;
    generating, by the input source agent, a plurality of enriched messages based on the plurality of statistical messages and the plurality of system calls;
    determining, by the input source agent, a grouping that is associated with the plurality of containerized application programs;
    grouping, by the input source agent, two or more enriched messages of the plurality of enriched messages into one or more metric groups based on the grouping associated with the plurality of containerized application programs;
    performing, by the input source agent, automatic correlation of each of the one or more metric groups;
    transmitting, by the input source agent, grouped and correlated enriched messages to the metric collector;
    aggregating, by the metric collector, the grouped and correlated enriched messages into a set of aggregated metrics values; and
    sending, from the metric collector to a monitoring application that is hosted on a second computer, the set of aggregated metrics values.

2. The method of claim 1, wherein a first container application of the plurality of containerized application programs is configured to send outbound metrics to a second metric collector.

3. The method of claim 1, wherein each of the plurality of system calls is one of: read, write, send, sendto, recv, recvfrom, sendmsg, sendmmsg, recvmsg, recvmmsg, pread, pwrite, ready, writev, preadv, pwritev, sendfile.

4. The method of claim 1, wherein the grouping is a hierarchy associated with the plurality of containerized application programs.

5. The method of claim 1, further comprising performing automatic correlation of at least one of system metrics, application metrics, infrastructure metrics, network metric, or container metrics.

6. The method of claim 1, wherein the plurality of containerized application programs are configured to send the one or more statistical messages to the localhost interface of the first computer at local IP address 127.0.0.1.

7. A computer-implemented method comprising:
    executing, in a first container of a first computer, an input source agent and a metric collector;
    executing, using the first computer, a plurality of containerized application programs in different corresponding containers, wherein the plurality of containerized application programs are configured to: send one or more statistical messages to an interface of the first computer; and send, to a host operating system kernel of the first computer each time a statistical message is sent, one or more system calls to interact with one or more resources or one or more applications of the first computer;
    intercepting, by the input source agent, a plurality of system calls sent from the plurality of containerized application programs to the host operating system kernel of the first computer to interact with one or more resources or one or more applications of the first computer;
    based on the intercepting of the plurality of system calls, obtaining, by the input source agent, a plurality of statistical messages relating to operation of the containerized application programs, wherein the plurality of statistical messages are distinct from the plurality of system calls;
    generating, by the input source agent, a plurality of enriched messages based on the plurality of statistical messages and the plurality of system calls by adding one or more of a container name tag, an application ID tag, and an image name tag to the statistical messages;
    determining, by the input source agent, a grouping that is associated with the plurality of containerized application programs;

grouping, by the input source agent, two or more enriched messages of the plurality of enriched messages into one or more metric groups based on the grouping associated with the plurality of containerized application programs;

performing, by the input source agent, automatic correlation of each of the one or more metric groups;

transmitting, by the input source agent, grouped and correlated enriched messages to the metric collector;

aggregating, by the metric collector, the grouped and correlated enriched messages into a set of aggregated metrics values; and sending, from the metric collector to a monitoring application that is hosted on a second computer, the set of aggregated metrics values.

8. The method of claim 7, wherein the plurality of containerized application programs are configured to send the one or more statistical messages to the interface of the first computer at local IP address 127.0.0.1.

9. A computer system comprising:
one or more processors;
one or more memories storing computer-executable instructions that, when executed by the one or more processors, cause the one or more processors to:
execute, in a first plurality of programmatic containers, a plurality of application programs programmed to send a plurality of application metrics messages to a localhost interface of the computer system, and to cause sending, to a host operating system kernel of the computer system each time that one of the application metrics messages is sent, one or more system calls to interact with one or more resources or one or more applications of the computer system;
execute, in a second programmatic container logically separate from the first plurality of programmatic containers, an input source agent and a collector module;
wherein the input source agent is programmed to listen for the one or more system calls and, in response to detecting a particular system call, to: intercept the particular system call; obtain a particular application metrics message that is associated with the particular system call; tag the particular application metrics message with one or more tag values; determine a grouping that is associated with the plurality of application programs; group two or more particular application metrics messages into one or more metric groups based on the grouping associated with the plurality of application programs; perform automatic correlation of each of the one or more metric groups; and send grouped, correlated, and tagged particular application metrics messages to the collector module.

10. The computer system of claim 9, wherein the one or more tag values comprise one or more of a container identifier, an application name, or an application identifier.

11. The computer system of claim 9, wherein the one or more tag values comprise one or more of a container name tag, an application ID tag, or an image name tag.

12. The computer system of claim 9, wherein each of the one or more system calls is at least one of read, write, send, sendto, recv, recvfrom, sendmsg, sendmmsg, recvmsg, recvmmsg, pread, pwrite, ready, writev, preadv, pwritev, or sendfile.

13. The computer system of claim 9, wherein
the grouping is a hierarchy associated with the other application programs.

14. The computer system of claim 9, further comprising computer-executable instructions that, when executed by the one or more processors, cause the one or more processors to perform automatic correlation of one or more of system metrics, application metrics, infrastructure metrics, network metrics, or container metrics.

15. The computer system of claim 9, comprising a first computer that hosts both the first programmatic container and the second programmatic container, and further comprising computer-executable instructions which when executed by one or more processors of the first computer cause the first computer to send the particular application metrics message with the tag values from the collector module to a monitoring application that is hosted on a second computer.

16. The computer system of claim 9, wherein the application program is programmed to send the plurality of application metrics messages to the localhost interface of the computer system at local IP address 127.0.0.1.

* * * * *